United States Patent
Eberle et al.

(10) Patent No.: US 7,810,759 B2
(45) Date of Patent: Oct. 12, 2010

(54) TUBE KITE

(75) Inventors: Till Eberle, Oberhaching (DE); Ken Winner, White Salmon, WA (US)

(73) Assignee: Boards & More AG, Clarens/Montreux (CH)

( * ) Notice: Subject to any disclaimer, the term of this patent is extended or adjusted under 35 U.S.C. 154(b) by 49 days.

(21) Appl. No.: 10/558,347

(22) PCT Filed: Nov. 10, 2004

(86) PCT No.: PCT/DE2004/002484

§ 371 (c)(1), (2), (4) Date: Dec. 6, 2006

(87) PCT Pub. No.: WO2005/058695

PCT Pub. Date: Jun. 30, 2005

(65) Prior Publication Data

US 2007/0120016 A1    May 31, 2007

(30) Foreign Application Priority Data

Dec. 17, 2003 (DE) .................. 103 59 480
Aug. 20, 2004 (DE) ................ 10 2004 040 510
Sep. 1, 2004 (DE) ................ 10 2004 042 669

(51) Int. Cl.
*B64C 31/06* (2006.01)

(52) U.S. Cl. .................................. 244/155 A

(58) Field of Classification Search ............. 244/155 A, 244/152, 153 R, 155 R
See application file for complete search history.

(56) References Cited

U.S. PATENT DOCUMENTS

| 4,286,762 | A  | * | 9/1981  | Prouty ................... 244/153 R |
| 6,830,220 | B2 | * | 12/2004 | Runyan .................. 244/155 A |
| 6,869,047 | B2 | * | 3/2005  | Pouchkarev ............ 244/155 A |
| 7,017,860 | B2 | * | 3/2006  | Royannais et al. ...... 244/155 A |
| 7,036,771 | B1 | * | 5/2006  | Pouchkarev ............ 244/155 A |
| 2004/0065780 | A1 | * | 4/2004 | Bellacera ................ 244/155 A |
| 2004/0159747 | A1 | * | 8/2004 | Runyan .................. 244/155 A |
| 2005/0121556 | A1 | * | 6/2005 | Blackman ............... 244/155 A |
| 2006/0038079 | A1 | * | 2/2006 | Chojnacki ............... 244/155 A |
| 2006/0102794 | A1 | * | 5/2006 | Quijano .................. 244/155 A |
| 2006/0226294 | A1 | * | 10/2006 | Logosz et al. ............... 244/152 |
| 2006/0237593 | A1 | * | 10/2006 | Godley ................... 244/155 A |
| 2008/0067291 | A1 | * | 3/2008 | Logosz et al. ........... 244/155 A |

FOREIGN PATENT DOCUMENTS

| DE | 202 20 025 U1 | 4/2003 |
| DE | 203 02 460 U1 | 5/2003 |
| DE | 203 03 089 U1 | 5/2003 |
| DE | 101 62 859 C1 | 6/2003 |
| DE | 203 03 088 U1 | 8/2003 |
| JP | 2003-026098 A | 1/2003 |

* cited by examiner

*Primary Examiner*—Michael R Mansen
*Assistant Examiner*—Brian M O'Hara
(74) *Attorney, Agent, or Firm*—Boyle Fredrickson, S.C.

(57) ABSTRACT

What is disclosed is a tube kite comprising two front lines which are combined into a tug line and adapted to be releasably secured to the surfer, and comprising two back lines which are adapted to be secured to a bar, wherein a supplementary line serving as an additional front line during the flight phase is provided.

19 Claims, 5 Drawing Sheets

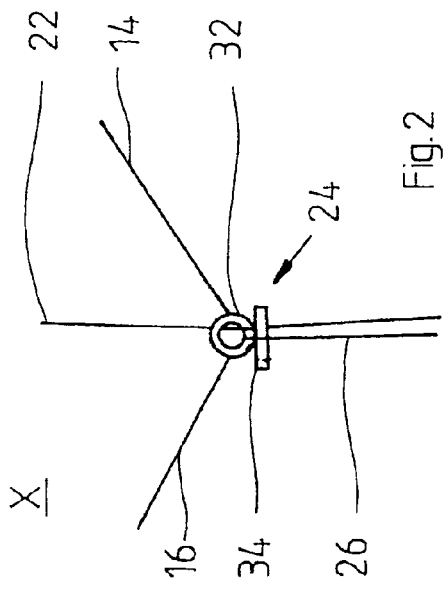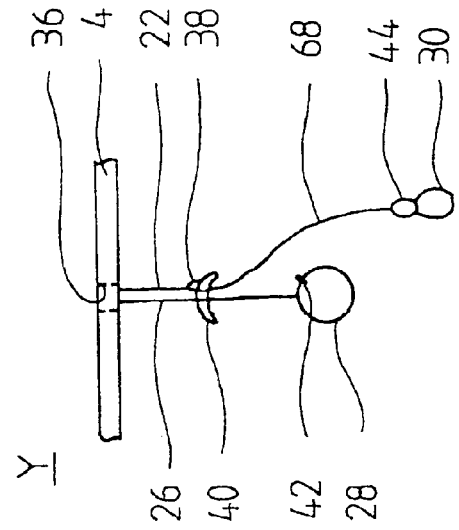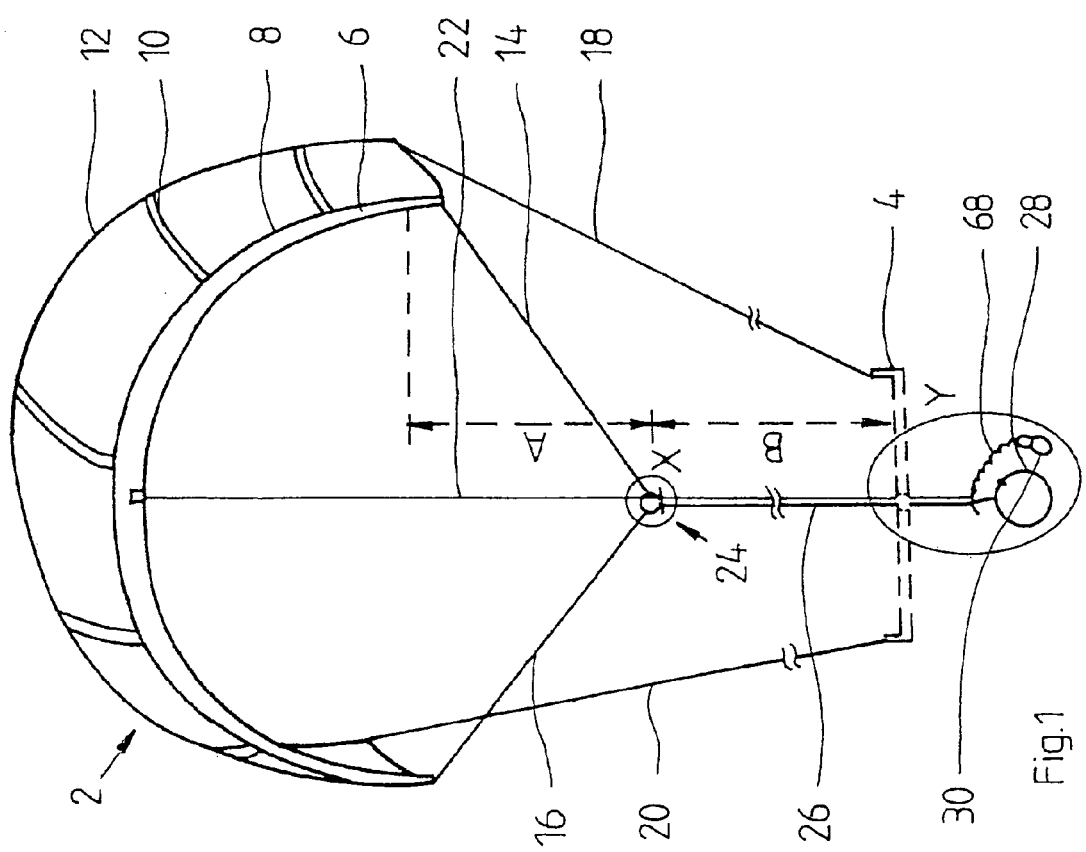

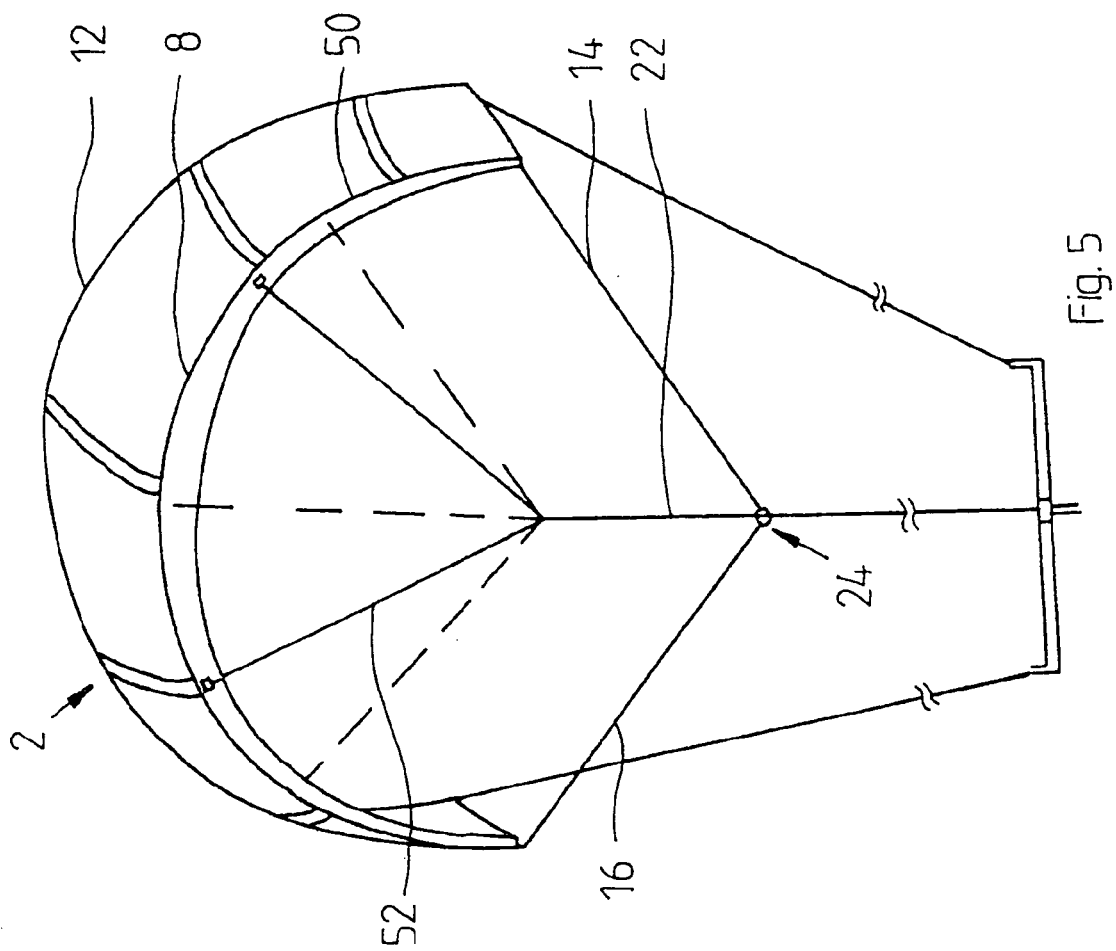
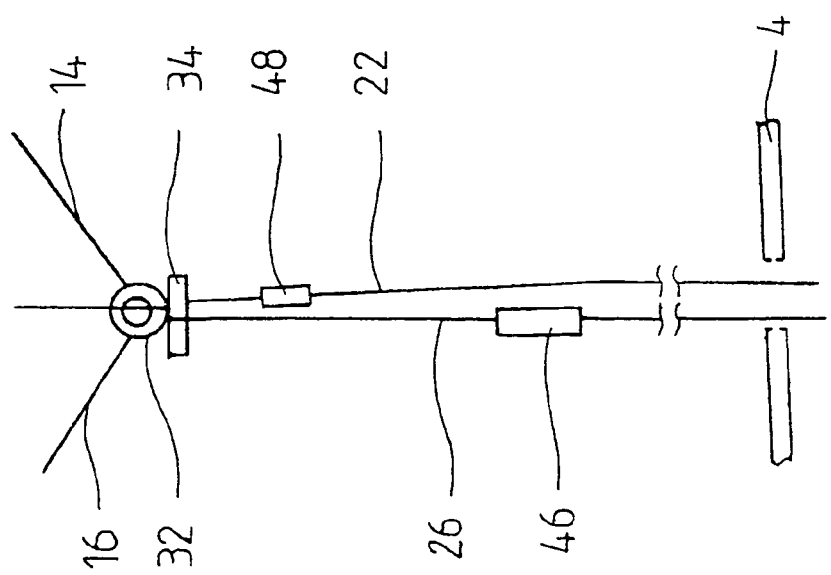

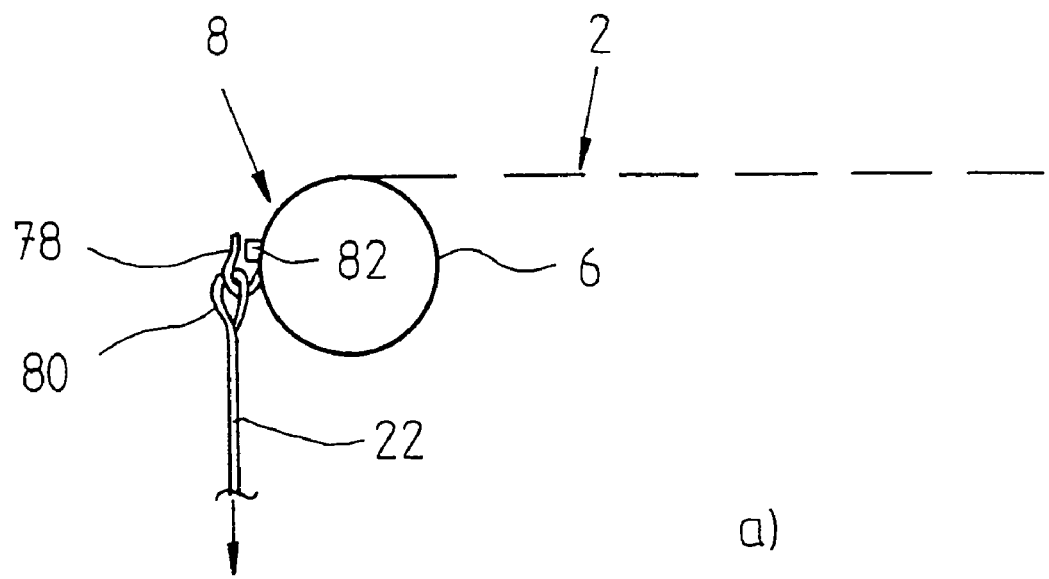
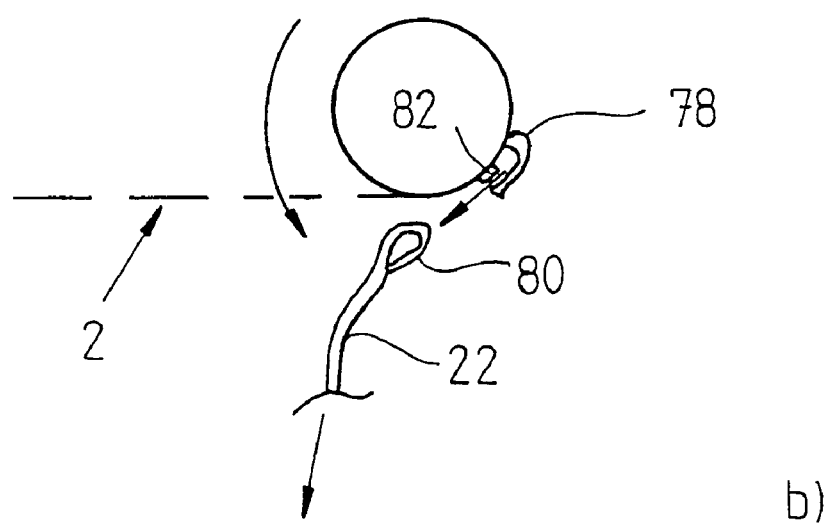
Fig. 10

TUBE KITE

BACKGROUND OF THE INVENTION

1. Field of the Invention

The present invention relates to a tube kite for kite-surfing in accordance with the preamble of claim 1.

Kite-surfing is enjoying increasing popularity. In addition to the surfer's individual skills, what is increasingly gaining importance is the geometry of the tube kite. The geometry is essentially determined by the profile of the tube kite, i.e., by the cut, an inflatable hose—"tube"—in a leading edge, the number and arrangement of ribs that are inflatable or in the form of a solid material for stabilization, and by the number and arrangement of tug lines leading to the surfer.

2. Description of the Related Art

One known solution of a tube kite is disclosed in DE 101 62 859C1. The tube kite includes four tug lines, i.e., two front lines and two back lines. The front lines are combined in the range of a bar. The combination of the front lines extends through the bar and is releasably secured to a surfer's trapeze. The two back lines act as steering lines and are secured to end portions of the bar for steering the tube kite. In order to bring the tube kite to a controlled crash and in order to facilitate the launch, a safety line is provided that attaches between the front lines on a leading edge and also leads to the surfer. In the flight phase, the safety line is relieved of load.

It is a drawback of this solution that the geometry of the tube kite may undergo changes during the flight phase, e.g., owing to incident gusts of wind or upon actuation of the back lines, so as to result in a drop of performance.

SUMMARY OF THE PRESENT INVENTION

It is an object of the present invention to furnish a tube kite that exhibits a stable geometry and a high performance.

This object is attained through a tube kite having the features in accordance with claim 1.

The tube kite in accordance with the invention comprises two front lines and two back lines. The front lines are combined into a common tug line and adapted to be releasably secured to the surfer. The two back lines serve as steering lines and are secured to a bar. In accordance with the invention an additional tug line is associated with the front lines. Thus the tube kite is suspended not only by two front lines but by three front lines. Thanks to this additional tug line—hereinafter referred to as a supplementary line—the geometry of the tube kite remains stable in the in-flight condition, i.e., the arc of the kite is preserved.

The supplementary line may attach at the tube kite in various ways. Thus it may, e.g., attach at the tube kite in the center between the two front lines, or in a branched configuration through a multiplicity of branch lines. Here it is conceivable to secure the supplementary line or the branch lines directly at a windward edge or between the windward edge and a leeward edge. In the same way, the supplementary line/branch lines may also attach through bridles, i.e., branching tie-on lines on the tube kite.

The supplementary line may attach no earlier than at a coupling portion of the two front lines, i.e., at the connection of the front lines with the tug line or below that. In principle the supplementary line may also be secured at the tug line between the bar and the surfer.

Advantageously the combination of the two front lines is arranged closer to the tube kite than to the bar. In a preferred variant the combination of the front lines is positioned—in dependence on the kite size or the length of the line system—in the range between 5 m underneath the kite and approximately 3 m above the bar or a power adjuster. This early combination is only possible because the supplementary line stabilizes the kite in the depowered condition owing to the transmission of force. In conventional solutions the coupling portion had to be provided further away from the kite, for otherwise the kite might have its arc changed strongly, which might result in a crash.

In one embodiment the coupling portion includes a ring at which the front lines are secured and from which the tug line extends to the surfer. In the flight phase, the supplementary line attacks at the ring through the intermediary of a stopper, so that the tensile force acting on the supplementary line is equally transmitted to the tug line. In order to enable a basic trimming of the supplementary line, the stopper is made to be adjustable.

In a preferred embodiment, the supplementary line is prolonged beyond the coupling portion in the direction of the bar. Thanks to this design it is possible to also use the supplementary line as a depower or safety line. Advantageously the supplementary line is taken through a guide member of the bar together with the tug line.

In one embodiment the tug line is secured to an openable retaining element on a trapeze of the surfer. The supplementary line is preferably adapted to be secured at a mount of the tug line or of the retaining element. The supplementary line is prolonged beyond the mount and releasably secured to the trapeze. When the retaining element is opened, the tube kite remains connected with the trapeze of the surfer by nothing but the supplementary line, while at least the front lines are relieved of load. As a result, complete depowering of the tube kite is possible by opening the retaining element. The retaining element may be opened directly or indirectly with the aid of a triggering member.

In another embodiment the tug line is secured to the openable retaining element through the intermediary of a release member which is guided on the supplementary line. Upon actuation of the release member the latter opens and the tug line is relieved, so that the tube kite continues to hang at the trapeze of the surfer by nothing but the supplementary line and consequently is depowered. For completely separating the tube kite from the surfer, the retaining element is opened.

For trimming the tug line, a trimming element is preferably provided between the coupling portion and the bar.

In order to pull tight the range of the supplementary line between the point of attack at the front lines or the tug line and the surfer, the supplementary line may be provided with a tightening element whereby it is kept tensioned.

This tightening element may also be formed by a clamp which is made fast in the range between the bar and the surfer, and at which the loose part of the supplementary line may be belayed so as to pull it tight. This clamp is preferably formed such as to automatically release the tug line once the bar is released, so that the tug line may act as a safety.

In the event of a crash it may happen that the kite rotates through 360° and the supplementary line wraps around the sail. In order to avoid damage as a result of the supplementary line cutting into the sail, it is secured at the front tube in such a way that it may be released during such a rotation.

Further advantageous embodiments are subject matter of further subclaims.

BRIEF DESCRIPTION OF THE DRAWINGS

In the following, preferred embodiments of the invention shall be explained in more detail by referring to schematic representations, wherein:

FIG. 1 shows a first embodiment of a tube kite in accordance with the invention which comprises a bar, FIG. 2 is an enlarged representation of the area X of FIG. 1, FIG. 3 is an enlarged representation of the area Y of FIG. 1, FIG. 4 shows an arrangement of a trimming element for a tug line and of a tightening element for a supplementary line in the tube kite of FIG. 1, FIG. 5 shows a configuration of lines in a second embodiment of the tube kite, FIG. 10 shows a possible manner of securing the supplementary line at the kite.

DETAILED DESCRIPTION OF THE PREFERRED EMBODIMENTS

Figure 7:
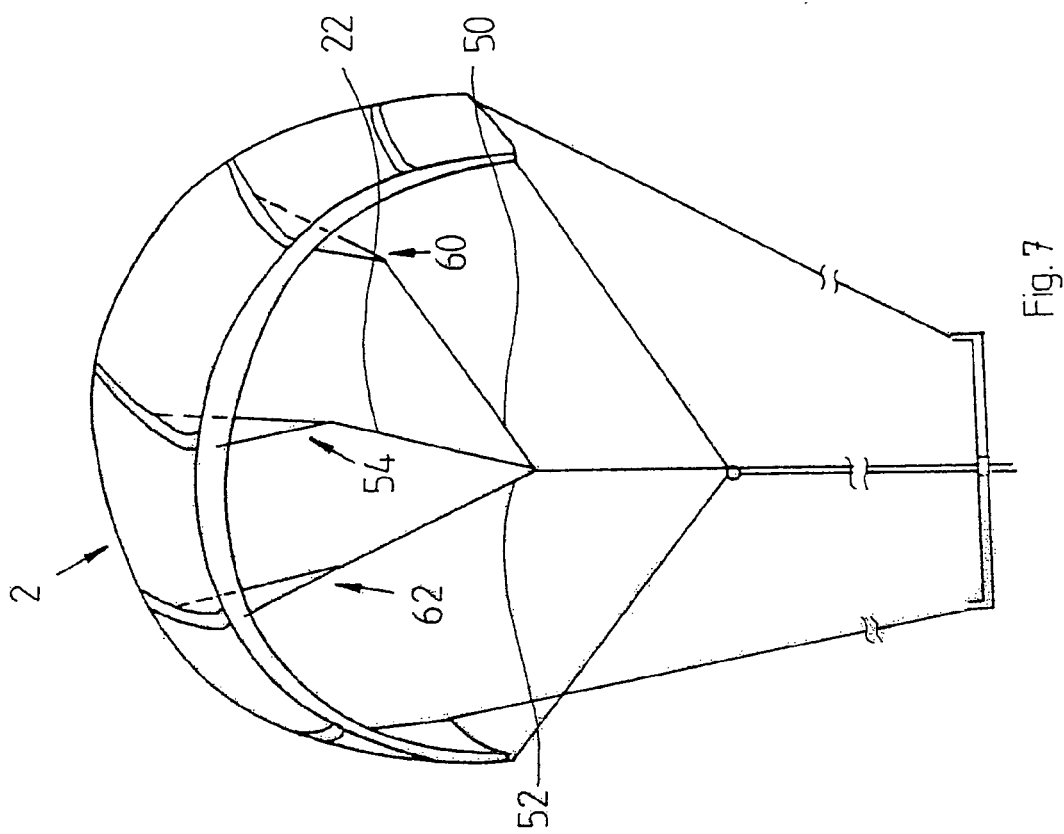
FIG. 7 shows a configuration of lines in a fourth embodiment of the tube kite.

FIG. 1 shows a tube kite 2 in accordance with the invention which comprises a bar 4. The tube kite 2 has an inflatable hose 6—"tube"—in the range of its windward edge or leading edge 8, and a multiplicity of ribs 10 extending towards its leeward edge or trailing edge 12. The tube kite 2 is connected with a surfer via two front lines 14, 16, two back lines 18, 20, and a supplementary line in accordance with the invention 22.

The front lines 14, 16 attack at end portions of the leading edge 8 and are combined through a coupling portion 24 (FIG. 2) into a tug line 26 releasably securable to a trapeze of the surfer through the intermediary of a retaining element 28—"chicken loop". Ideally the coupling portion 24 is arranged more closely to the tube kite 2 than to the bar 4. I.e., the distance A indicated in FIG. 1 is smaller than the indicated distance B.

The back lines 18, 20 or steering lines attack at end portions of the trailing edge 12 and are secured to end portions of the bar 4.

The supplementary line 22 in accordance with the invention attacks immediately between the front lines 14, 16 at the leading edge 8 and extends beyond the coupling portion 24. It extends in parallel with the tug line 26 and is releasably secured to the trapeze through the intermediary of an extension line 68—"safety leash"—and a connecting element 30 (FIG. 3).

FIG. 2 is an enlarged representation of the coupling portion 24. The coupling portion 24 includes a ring 32 at which the front lines 14, 16 attack and starting out from which the tug line 26 extends. The supplementary line 22 is taken through the ring 32 and is adapted to be taken into contact with the ring 32 in the flight phase by means of a stopper 34, so that the tensile forces may be transmitted to the tug line 26. The expression flight phase here is to mean the condition from launch to landing in the absence of any depowering of the tube kite 2. The stopper 34 is adjustable for trimming the supplementary line 22.

FIG. 3 shows an enlarged representation of the area Y of FIG. 1. The tug line 26 and the supplementary line 22 extend through a guide member 36 of the bar 4 and are releasably secured to the trapeze through the openable retaining element 28 or the openable connecting element 30. For opening the retaining element 28 or the connecting element 30, integrated closures 42, 44 are provided. In addition to the guide member 36 through the bar 4, the supplementary line 22 is secured through the intermediary of a securing element 38 having the form of an eye on a mount 40 which is in this embodiment arranged at the tug line 26.

For trimming the tug line 26, in accordance with FIG. 4 a trimming element 46 may be arranged on it. In order to keep the supplementary line 26 tightened in the range between the coupling portion 24 and the mount 40, the supplementary line 22 may have associated a tightening element 44, for instance a rubber. This prevents inadvertent sliding of the eye from the mount 40 and uncontrolled "flapping" of the supplementary line 22 even when the trim of the tug line 26 is changed. This tightening element may also be embodied in a clamp in which the "loose" portion of the supplementary line is pulled tight and belayed. The clamp (e.g., a comb-clamp) is designed to keep the supplementary line 22 tightened in the flight phase and release it when the bar 4 is released.

The supplementary line 26 in accordance with the invention essentially has three advantages:

Firstly, the supplementary line 22 acts as a third front line in the flight phase, whereby the geometry of the tube kite 2 is stabilized and a uniform high performance is obtained. In the flight phase, the stopper 34 contacts the ring 32 so that the tensile forces acting on the supplementary line 22 are introduced into the tug line 26. Thus the supplementary line 22 is substantially free from forces in its range from the stopper 34 to the mount 40 and biased by nothing but the tightening element 48.

Secondly, the supplementary line 22 acts as a depower line or safety line because of the prolongation beyond the coupling portion 24 to the surfer. By adjusting the tension or length of the supplementary line 22 it is possible to change the angle of attack of the kite and optimize the kite's performance in dependence on the wind force. Complete depowering is necessary whenever the surfer has lost control of his tube kite 2. In this case it is necessary to make the tube kite 2 turn out of the wind, so that the wind can no longer attack. For complete depowering, the surfer opens the retaining element 28, whereby the tug line 26 and thus the front lines 14, 16 are relieved. The ring 32 moves in a direction towards the tube kite 2, and the supplementary line 26 is released from the mount 40. Owing to the relief of the front lines 14, 16 the tube kite 2 turns out of the wind. Due to the fact that the supplementary line 22 is secured to the surfer, it is "tightened through" and thus allows for a controlled turning away of the tube kite 2. "Tightening through" here means that the supplementary line 22 now carries the tube kite 2 over its entire length. Whereas in accordance with the above explanation during the flight phase only the range of the supplementary line 22 between the tube kite 2 and the stopper 34 jointly absorbs the forces acting on the tube kite 2, and these forces are introduced into the tug line 26 starting from the stopper 34, now the contact engagement of ring 32 and stopper 34 is neutralized, and the forces acting on the tube kite 2 are transmitted beyond the stopper 34 to the connecting element 30 on the surfer.

For an emergency separation of the tube kite 2 it is possible to open the closure 44 of the connecting element 30, so that when the bar 4 is released it is completely released from the surfer.

Thirdly it is possible, for instance in the event of a water launch following depowering, to easily put the tube kite 2 on its back, i.e., its trailing edge 12, and thus take it into its optimum launch position, by pulling on the supplementary line 22. Here the surfer may pull the supplementary line 22 and change the geometry of the tube kite 2 until the latter starts to rise from the water. Once the tube kite 2 has made the transition into the flight phase, the surfer lets go of the supplementary line, so that the latter together with its stopper 34 moves into contact with the ring 32 and thus again acts as a third front line.

Figure 6:
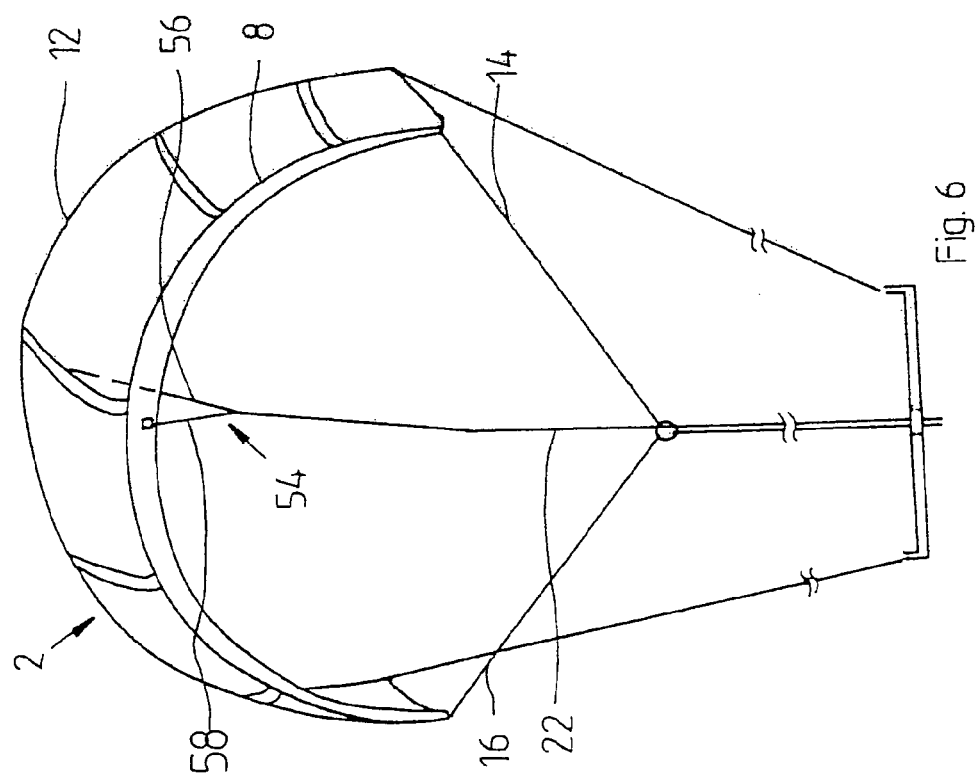
FIG. 6 shows a configuration of lines in a third embodiment of the tube kite.

FIGS. 5, 6 and 7 show further embodiments of the supplementary line 22 and its fastening to the tube kite 2. In each embodiment the coupling portion 24 is provided, so that the basic function of the supplementary line 22 is not changed in comparison with the above described embodiment.

Thus, in accordance with FIG. 5, the supplementary line 22 may attack at the leading edge 8 through the intermediary of a multiplicity of branch lines 50, 52 regularly extending in the transverse direction of the tube kite 2 between the front lines 12, 14. Advantageously the branch lines 50, 52 do not reach down to the coupling portion 24 but are secured to the supplementary line 22 at a distance from the coupling portion.

The dashed lines correspond to further branch lines and are intended to make clear that the number of branch lines 50, 52 may be varied at will. It is equally conceivable to have the branch lines 50, 52 or the supplementary line 22 attack not at the leading edge 8 but also in areas between the leading edge 8 and the trailing edge 12.

In accordance with FIG. 6, the supplementary line 22 may attack at the tube kite 2 between the front lines 14, 16 through the intermediary of a bridle 54. The bridle 54 has bridle lines 56, 58 which are secured to an end of the supplementary line 22 and successively in the leeward direction, i.e., between the leading edge 8 and the trailing edge 12, attack at the tube kite 2.

In accordance with FIG. 7, the embodiments of FIGS. 5 and 6 may also be combined in such a way that the supplementary line 22 itself is secured to the tube kite 2 through the intermediary of a bridle 54, and at the same time is branched via branch lines 50, 52 including bridles 60, 62.

Figure 9:
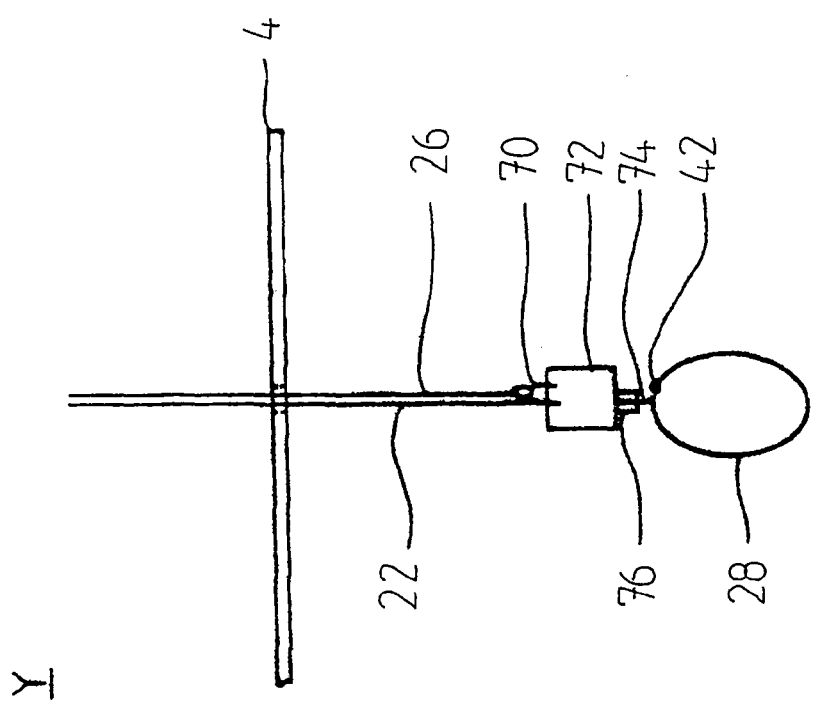
FIG. 9 shows a further alternative of the area Y of FIG. 1.
Figure 8:
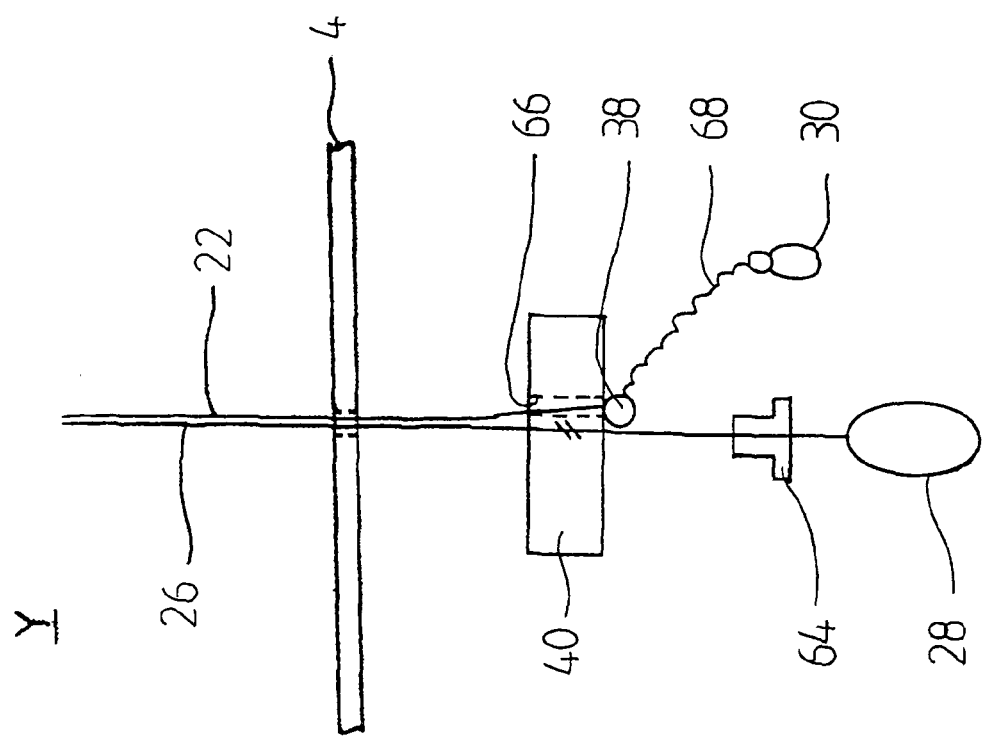
FIG. 8 shows an alternative of the area Y of FIG. 1.

FIGS. 8 and 9 show alternative releasing mechanisms of the tug line 26 and of the supplementary line 22 in the range of the surfer.

In the embodiment in accordance with FIG. 8, the retaining element 28 of the tug line 26 is opened through the intermediary of a triggering member 64. This triggering member 64 is guided on the tug line 26 in the form of a fastenable sliding sleeve. Upon a displacement of the triggering member 64 in the direction of the mount 40 for the supplementary line 22, the retaining element 28 is opened and the tug line 26 is relieved, whereby the supplementary line 22 is "tightened through" owing to the releasable fastening at the surfer with the extension line 68 and the connecting element 30, and the tube kite 2 is depowered.

The mount 40 has the form of a stop with a recess 66 in which the supplementary line 22 is guided. As a securing element 38 a sphere is provided, the external diameter of which is greater than the internal diameter of the recess 66, so that it can not be pulled through the recess 66. By means of the tightening element 48 in accordance with FIG. 4, the sphere is held in contact with the mount 40 in the flight phase.

The triggering member 64 may, of course, also have the form of a rotating body.

FIG. 9 shows an embodiment in which the extension line 68 of the supplementary line 22 is omitted. The tug line 26 is secured to a hoop 70 of a release member 72 which is in connection with the retaining element 28. The release member 70 is directly or, as in this representation, indirectly connected with the retaining element 28 through the intermediary of a fastening body 74. In order to avoid twisting and thus high friction of supplementary line 22 and tug line 26, a swivel 76 is arranged between the release member 70 and the fastening body 74. The supplementary line 22 is guided in the release member 72 and also connected with the fastening body 74.

Upon actuation of the release member 72, the latter slides along the supplementary line 22 in a direction towards the bar 4. Accordingly the supplementary line 22 is "tightened through", and the tube kite 2 is depowered. For completely separating the tube kite 2 from the surfer, an openable closure 42 is arranged in the retaining element 28 as an emergency separation, by opening of which the supplementary line 22 is also released from the surfer.

Instead of the displacement of the release member 72 it is equally conceivable that upon actuation the hoop 70 opens and the tug line 26 is thus relieved.

In the event of a crash it may happen that the tube kite 2 rotates about its transverse axis, i.e., about the longitudinal axis of the tube 6 (coiling), which rotation takes place in the direction of pull of the supplementary line 22. In most cases the supplementary line 22 will slide off laterally when such coiling occurs, so that the surfer first of all has to rearrange the lines for a new launch. It may happen, however, that the supplementary line wraps around the kite and the kite is then damaged or even severed upon opening of the tube kite 2 following such coilng owing to the whiplash effect of the thin supplementary line 22. In order to avoid such damage, the supplementary line 22 is releasably secured to the hose 6 (tube) in the exemplary embodiment represented in FIG. 10. This releasable fastening it selected such that the supplementary line 22 comes free in the event of this undesirable coiling of the kite and thus cannot wrap around it. The kite retains its full manoeuvering capability, and the surfer may ride back to the beach in order to insert the supplementary line .22.

In accordance with FIG. 10*a*, suspension of the supplementary line 22 may be carried out with the aid of a hook 78 which is secured to the hose 6. Into this hook 78 a loop 80 of the supplementary line is inserted. The hook 78 is provided with a retaining element 82, for instance an elastic knob, which is formed such that the loop 80 may be inserted in the hook 78 by elastic deformation of the retaining element 82, and a certain bias of the retaining element 82 must be overcome for release. This releasing force is adjusted such that in normal operation (flight phase, launch, "controlled" crash) the supplementary line 22 can not come free from the hook 78. If, however, the coiling indicated in FIG. 10*a*, occurs, wherein the tube kite 2 rotates in the direction of the arrow relative to the normal position of FIG. 10*a*, then the tensile force acting on the tug line 22 and the torque acting on the tube kite is high enough to overcome the retaining force of the retaining element 82 and pull the supplementary line 22 from the hook 78, so that the supplementary line 22 comes loose.

It is, of course, possible to also use some other suitable releasable connection instead of the hook 78 provided with an elastic retaining element 82.

The applicant reserves the right to direct a divisional application to the releasable connection of a fifth line (a mere safety line or supplementary line within the meaning of the invention) on the kite.

What is disclosed is a tube kite comprising two front lines which are combined into a tug line and adapted to be releasably secured to the surfer, and comprising two back lines which are adapted to be secured to a bar, wherein a supplementary line serving as an additional front line during the flight phase is provided.

The invention claimed is:

1. A tube kite for kite-surfing comprising two front lines attached to a coupling portion and a tug line connected to the coupling portion and being adapted to be releasably secured to the surfer, two back lines adapted to be secured to a bar, and at least one supplementary line which attaches at the tube kite, characterized in that the supplementary line is coupled to the tug line at the coupling portion or between the coupling portion and the bar, and above the bar, such that when tensile forces act on the supplementary line in a flight phase, the supplementary line in addition to the front lines and the back lines stabilizes the geometry of the tube kite in the flight phase, wherein during the flight phase, the tensile forces acting on the supplementary line are introduced into the tug line.

2. The tube kite in accordance with claim 1, wherein the supplementary line attaches between the front lines at a leading edge.

3. The tube kite in accordance with claim 2, wherein the supplementary line or the branch lines attach at the tube kite through bridles.

4. The tube kite in accordance with claim 1, wherein the supplementary line branches and attaches at the tube kite, preferably at the leading edge, through branch lines.

5. The tube kite in accordance with claim 1, wherein the coupling portion is arranged closer to the tube kite than to the bar.

6. The tube kite in accordance with claim 1, wherein the coupling portion is located in the range between 5 m below the kite and 3 m above the bar.

7. The tube kite in accordance with claim 1, wherein the front lines are secured to a ring of the coupling portion from which the tug line extends, the supplementary line having a stopper which is adapted to contact the ring in the flight phase.

8. The tube kite in accordance with claim 7, wherein the stopper is adjustable.

9. The tube kite in accordance with claim 1, wherein the supplementary line is prolonged beyond the coupling portion in a direction towards the bar.

10. The tube kite in accordance with claim 1, wherein the tug line and the supplementary line are taken through a guide member of the bar.

11. The tube kite in accordance with claim 10, wherein the tug line is secured to an openable retaining element on a trapeze of the surfer, wherein a mount is provided to which the supplementary line may be secured.

12. The tube kite in accordance with claim 11, wherein the supplementary line is prolonged beyond the mount and adapted to be releasably secured to a trapeze.

13. The tube kite in accordance with claim 11, wherein a triggering member which opens the retaining element upon actuation is arranged between the mount and the retaining element on the supplementary line.

14. The tube kite in accordance with claim 11, wherein the supplementary line extends from the mount to a trapeze and is adapted to be releasably secured to the latter.

15. The tube kite in accordance with claim 11, wherein the tug line is adapted to be releasably secured to the retaining element through the intermediary of a release member guided on the supplementary line.

16. The tube kite in accordance with claim 1, wherein a tightening element for tightening the supplementary line is provided between the coupling portion and the surfer.

17. The tube kite in accordance with claim 1, wherein a trimming element for trimming the tug line is provided.

18. The tube kite in accordance with claim 1, wherein the supplementary line is releasably secured to a leading edge of the tube kite such as to release in the event of an inadvertent rotation of the latter.

19. A tube kite for kite-surfing comprising two front lines extending downwardly from the kite and being attached to a ring, a first tug line attached to the ring and being adapted to be releasably secured to the surfer, a trimming element for adjusting a length of the first tug line, two back lines adapted to be secured to a bar, at least one supplementary line extending through the ring and attaching to the tube kite at an upper portion thereof and defining a second tug line at a lower portion thereof, and a stopper attached to the supplementary line below the ring, characterized in that tensile forces acting on the supplementary line in a flight phase pull the stopper upwardly into the ring such that additional applications of tensile forces to the supplementary line are shared between the first and second tug lines, wherein an arc profile of the kite is stabilized by the two front lines and the supplementary line.

* * * * *